United States Patent [19]
Schottler et al.

[11] Patent Number: 5,933,795
[45] Date of Patent: Aug. 3, 1999

[54] SPEED SENSING DEVICE

[75] Inventors: Joseph Julius Schottler, Crystal, Minn.; C. Kells Hall, Ames, Iowa

[73] Assignee: Sauer Inc., Ames, Iowa

[21] Appl. No.: 08/813,657

[22] Filed: Mar. 7, 1997

Related U.S. Application Data

[60] Provisional application No. 60/013,650, Mar. 19, 1996.

[51] Int. Cl.⁶ ............................ F16H 61/46; G06F 15/06
[52] U.S. Cl. ............................................. 702/145; 60/448
[58] Field of Search ................ 364/565, 474.02–474.05, 364/528.17; 82/18, 118; 425/113, 381; 702/142, 145; 60/448; 417/53

[56] References Cited

U.S. PATENT DOCUMENTS

| | | |
|---|---|---|
| 4,158,290 | 6/1979 | Cornell . |
| 4,180,979 | 1/1980 | Cornell . |
| 4,274,257 | 6/1981 | Koch, Jr. et al. . |
| 4,444,286 | 4/1984 | Hawkins et al. . |
| 4,474,104 | 10/1984 | Crefield . |
| 4,546,664 | 10/1985 | Mylander ............................ 74/473 R |
| 4,559,778 | 12/1985 | Krusche . |
| 4,702,843 | 10/1987 | Oswald et al. . |
| 4,746,281 | 5/1988 | Laugs et al. ............................ 425/113 |
| 4,766,779 | 8/1988 | Massy . |
| 4,836,693 | 6/1989 | Stroze ..................................... 384/121 |
| 5,070,695 | 12/1991 | Metzner .................................... 60/448 |
| 5,073,091 | 12/1991 | Burgess et al. ....................... 417/222.1 |
| 5,135,031 | 8/1992 | Burgess et al. ..................... 137/625.65 |
| 5,184,466 | 2/1993 | Schniederjan et al. .................. 60/448 |
| 5,341,311 | 8/1994 | Liebler ............................... 364/548.17 |
| 5,419,223 | 5/1995 | Kubler et al. ............................. 82/118 |
| 5,435,131 | 7/1995 | Hausman et al. ......................... 60/327 |
| 5,468,126 | 11/1995 | Lukich ..................................... 417/53 |
| 5,678,462 | 10/1997 | Bausenhart et al. ................... 74/731.1 |

*Primary Examiner*—Kamini Shah
*Attorney, Agent, or Firm*—Zarley, McKee, Thomte, Voorhees & Sease

[57] ABSTRACT

A speed sensor for sensing the speed and direction of a hydrostatic motor or pump measures the speed, monitors an operator input, processes this information and generates a high power output to drive a solenoid valve or electrical displacement control. The sensor is housed in a single package mounted directly on the hydrostatic motor or pump. The function of the sensor can be easily modified with software changes.

17 Claims, 5 Drawing Sheets

- Foot Pedal Propel
- Ramping

- Speed Control
- Speed Switch
- Overspeed Protection

- Speed Control with Feed Forward

- Proportional MV Control

- Hi-Low MV Control

SPEED SENSING DEVICE

THIS APPLICATION IS BASED UPON THE APPLICANTS' PROVISIONAL APPLICATION SER. NO. 60/013,650, FILED MAR. 19, 1996

BACKGROUND OF THE INVENTION

A typical prior art speed sensor includes a speed sensor mounted directly to a hydrostatic pump or motor to monitor the speed and direction of the unit. The prior art speed sensor then sends the signals for speed and direction to a controller or indicator located elsewhere. The prior art has several disadvantages including inflexibility, high cost, poor performance, etc. In the past, various functions have been done using multiple electronic modules and components or with hydraulic or manual controls, or not at all.

It is therefore a principle object of this invention to provide a speed sensing device which performs all the functions of measuring speed, monitoring operator input, processing input, and generating a high power output to drive a solenoid valve or EDC which is included one package directly mounted to a hydrostatic unit.

A further object of this invention is to provide a speed sensing device which can be easily modified with software changes.

A further object of this invention is to provide a speed sensing device which can be used for various applications.

These and other objects of the invention will become apparent to those skilled in the art.

SUMMARY OF THE INVENTION

The speed sensing device of the present invention includes a sensor for sensing the speed and direction of a hydrostatic motor or pump. The device measures the speed, monitors an operator input, processes this information and generates a high power output to drive a solenoid valve or electrical displacement control. The device is housed in a single package mounted directly on the hydrostatic motor or pump. The function of the device can be easily modified with software changes.

DESCRIPTION OF THE PREFERRED EMBODIMENT

The present invention will be described as it applies to its preferred embodiment. It is not intended that the present invention be limited to the described embodiment. It is intended that the invention cover all alternatives, modifications, and equivalences which may be included within the spirit and scope of the invention.

A speed sensing device 10 of the present invention performs the functions of measuring speed, monitoring operator input, processing inputs and generating a high power output to drive a solenoid valve or EDC. All these functions are performed by the present invention which is housed in a single package and mounted directly to a hydrostatic unit, for example. The function of the device can easily be modified with software changes. Calibration parameters can be downloaded to the device from a personal computer even after the device is installed.

Figure 1:
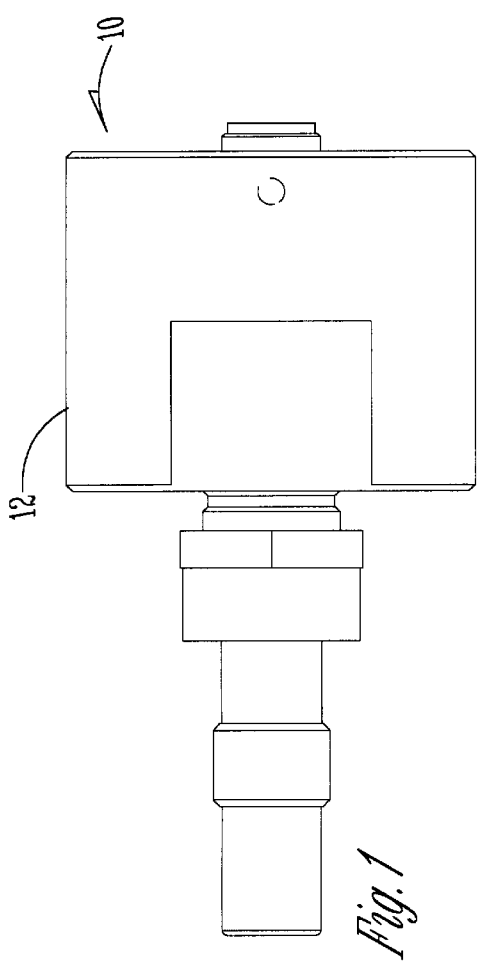
FIG. 1 shows a top view of a speed sensing device of the present invention.

FIG. 1 shows a speed sensing device 10 of the present invention. The speed sensing device 10 threads into a hydrostatic pump or motor (not shown) to sense the speed and direction of rotation of the pump or motor. The device 10 has a limited number of input/outputs intended for simple applications involving decisions and/or control based on speed.

One application of the speed sensing device 10 is as a smart speed switch. The smart speed switch makes decisions based on operator request (through a momentary switch input) and motor speed to drive the high current output of the device 10 to a high or low state. This is described in more detail below.

Figure 3:
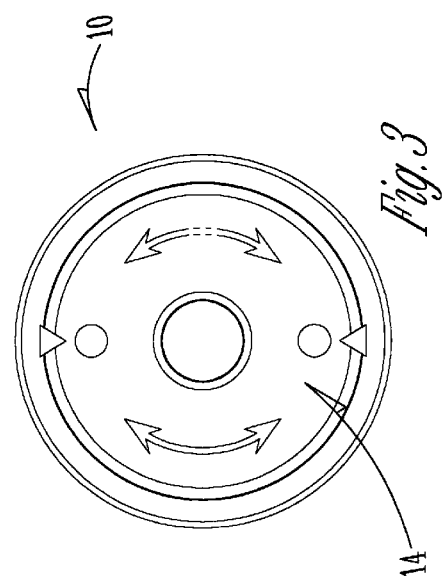
FIG. 3 shows an end view of the device shown in FIG. 1.
Figure 2:
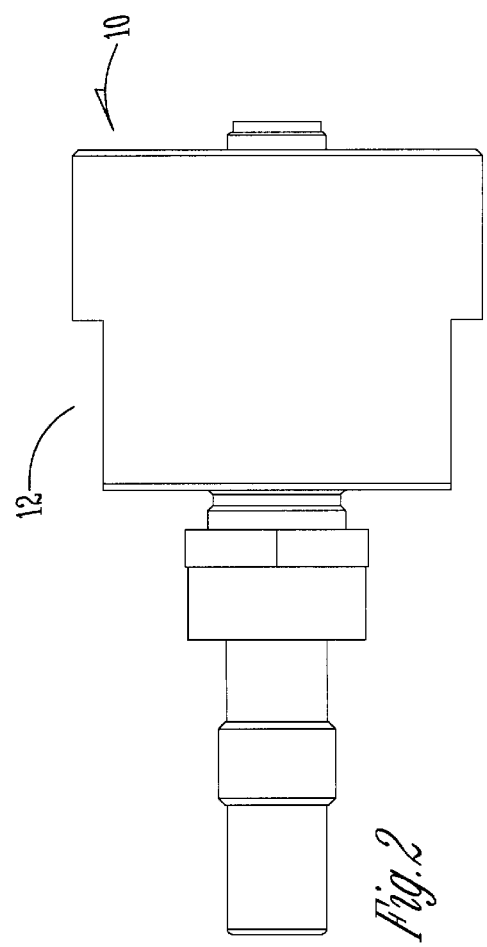
FIG. 2 shows a side view of the device shown in FIG. 1.
Figure 4:
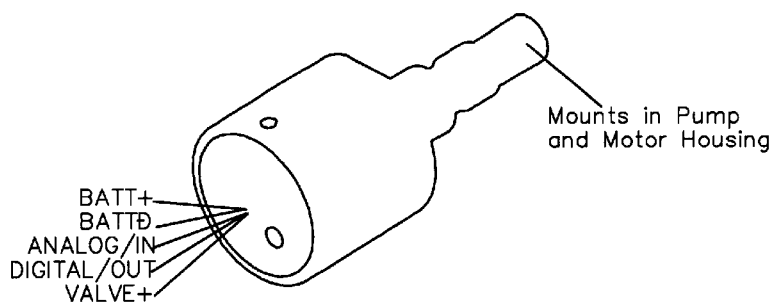
FIG. 4 shows a perspective view of the device shown in FIG. 1.
Figure 5A:
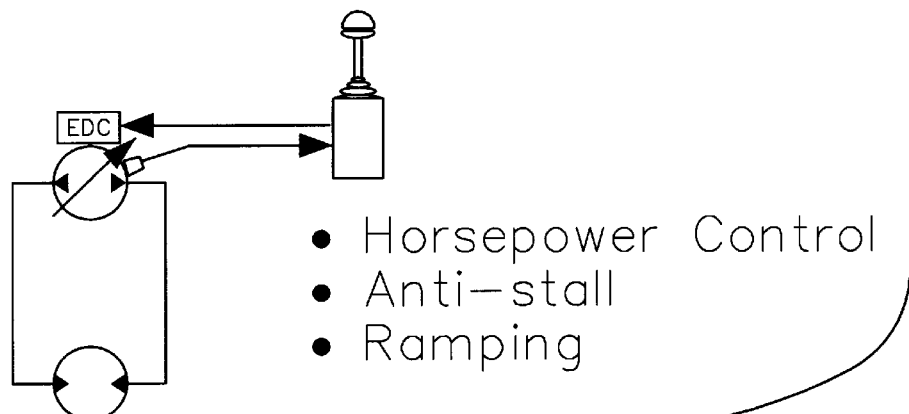
FIGS. 5A–5H show various applications of the present invention.
Figure 5B:
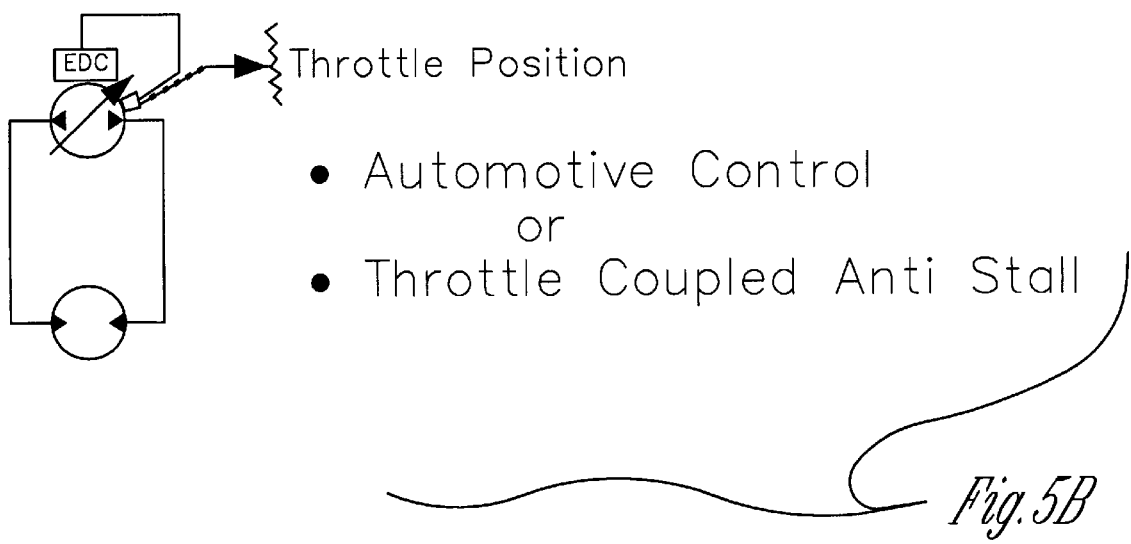
Figure 5C:
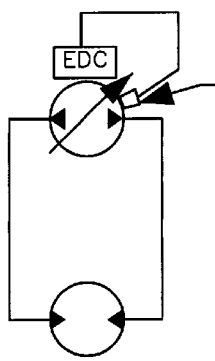
Figure 5D:
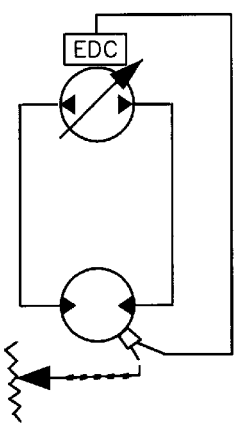
Figure 5E:
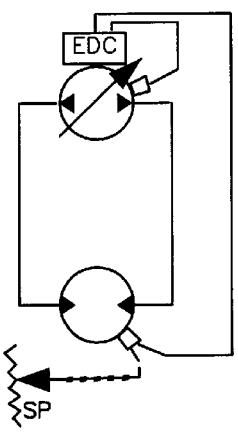
Figure 5F:
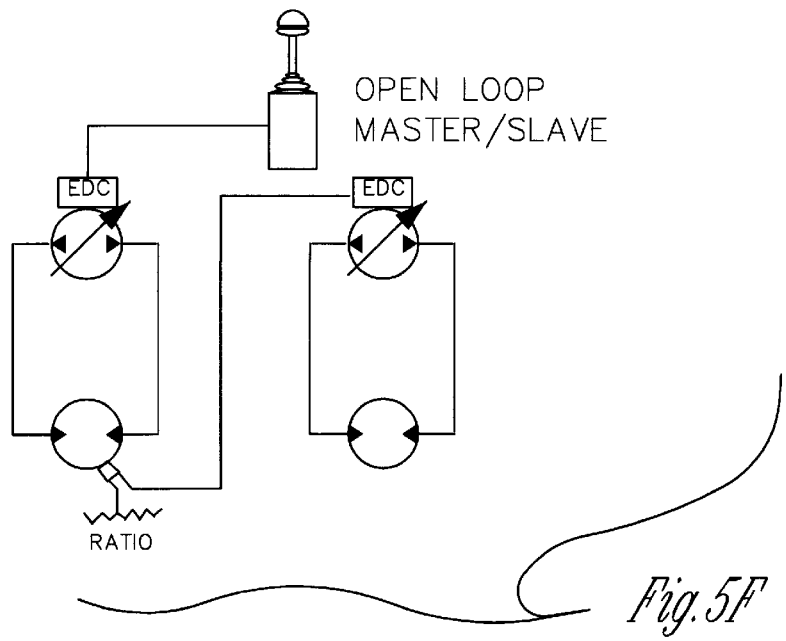
Figure 5G:
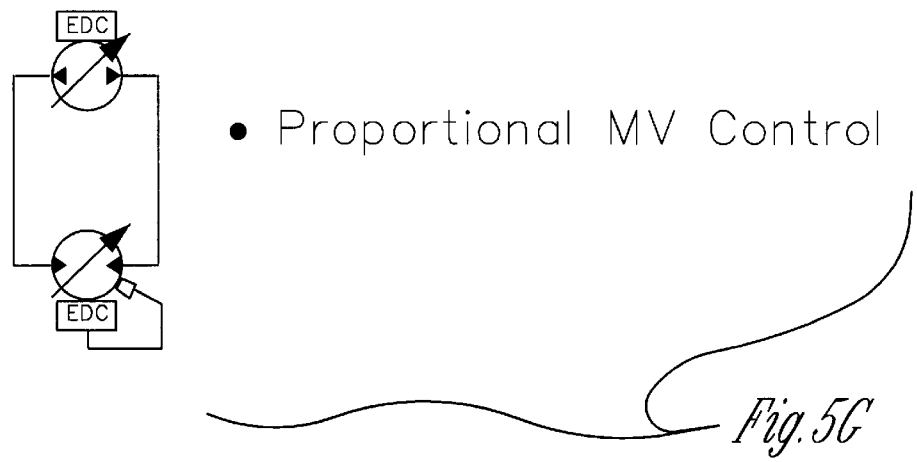
Figure 5H:
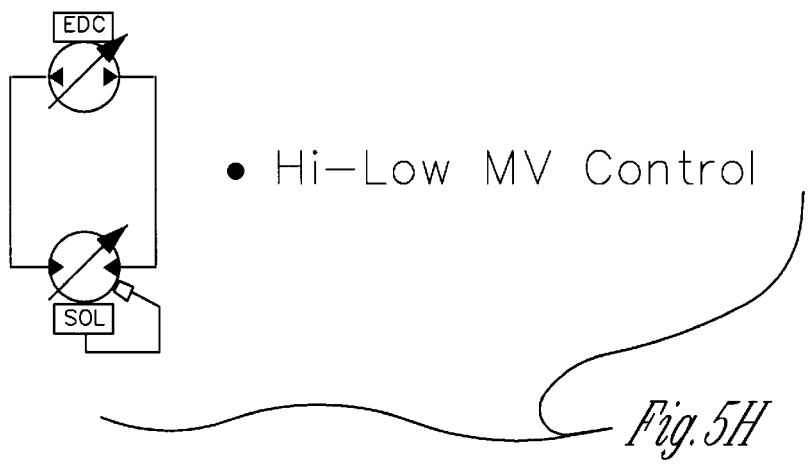

The speed manager sensing device 10 shown in FIGS. 1–3 is shaped like a KPP pulse pickup with an expansion region 12 where the microprocessor U1 and power switch reside. Just like the KPP pulse pickups, the speed sensing device 10 is used in conjunction with a KK147NN speed ring inside the pump or motor to provide the magnetic field for the speed sensing device 10 to monitor.

The speed sensing device 10 includes a connector 14. The connector 14 is a five pin M12x1 (same as KPPXXX6 with one more pin). The five pins are used as follows:

1. Battery+(Connection to positive supply)
2. Battery−(Connection to Ground, internally connected to the device case)
3. High side high current output
    3 Amps max.
    Short circuit protected
    has PWM capability
4. Low current output
    680 Ω series resistor
    Typically a speed output, but can be used for other purposes
    Protected from shorts to Ground or Battery+
    Serves as serial transmit when adjusting serial EE parameters
    Can be used as a switch input.
5. General purpose analog input
    Typically a switch input Has 8 bit A/D capability (0–5 V)
    Protected from shorts to Ground or Battery+
    Serves as serial receive when adjusting serial EE parameters The speed sensing device 10 is capable of sensing speed and direction of the hydrostatic pump or motor which it is mounted to. The device 10 is also capable of sensing temperature.

Figure 6:
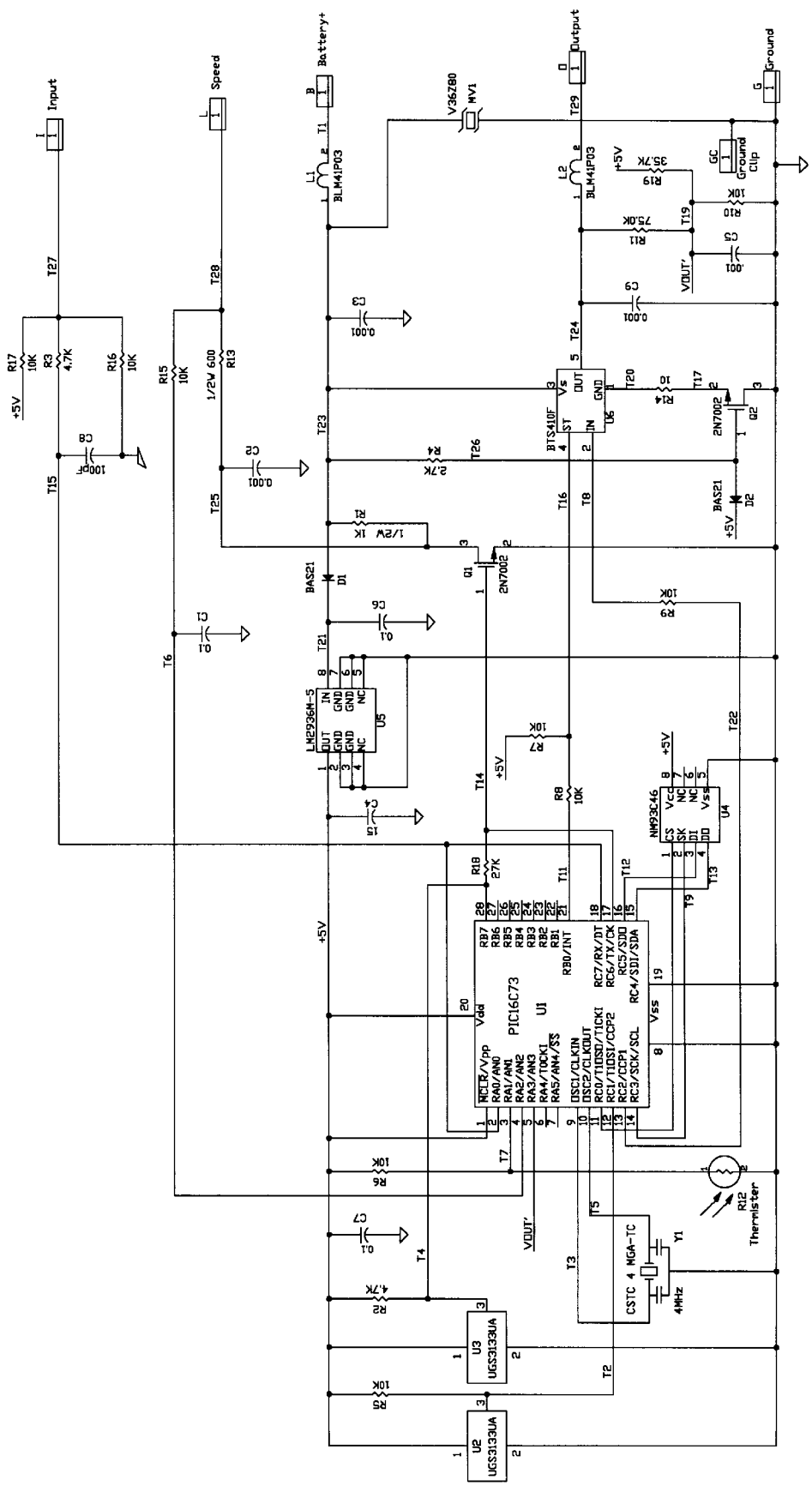
FIG. 6 shows an electrical schematic of the present invention.

As shown in FIG. 6, the speed sensing device 10 uses a one time programmable Microchip-PIC16C73 microprocessor U1 with 4 K program memory along with a 4 MHz ceramic resonating oscillator (±0.5% tolerance over temperature).

The device 10 includes on board serial EE for parameter storage. To facilitate programming serial EE parameters, the general purpose input will serve as a serial input and the low current output a serial output. With some external interface circuitry, this device can be connected to a PC serial port for programming parameters.

The present invention has the following ratings:

Power supply range: 9–32 V

Operating temp. range: −40 to +115° C.

PPU frequency range: 0 to 7 kHZ

Electrical transient protection, EMI, Vibration & Shock per MCES-015 Level 1.

Gap to Speed Rings (KK147XX): 0.030" Maximum

Alignment to Speed Rings (KK147XX): Centerline of speed manager to Centerline of speed ring ±0.040"

Angular position to Speed Ring (for direction sensing only):

Centerline of speed ring to angular position mark on KSM ±5°

The circuit board, connector, and end cap (built as one assembly) of the device 10 is designed to rotate freely inside the housing 12 with two set screws to hold this rotation. This feature allows the KSM device to be installed in a two step fashion. First the gap to the speed ring is set to exactly ½ turn out from touching the speed ring. Next the angular position is set by rotating the end cap (and hence the circuit board) to the correct position for accurate direction sensing. This angular position is clearly marked to each installation. This procedure will then allow for more consistent installations with no need to calibrate direction (as is done with the KPP devices) after installation.

All devices will be tested on an automated test fixture (LabVIEW) which will verify correct output signals with some set of input values.

A first specific function this device is intended to address is a generic speed switch for controlling the swash angle of a two speed hydrostatic motor. In this embodiment, the device 10 will monitor the speed and direction of a two speed hydrostatic motor it is mounted to and will drive the solenoid valve which sets the angle of the motors swash plate to either minimum (high speed) or maximum (low speed). The device 10 will also accept input from an externally mounted switch which the operator will use to request a swash angle change. The control logic of this embodiment is as follows:

A. While going backward (motor rotating in reverse) the swash angle will always be set to maximum (slow speed).

B. If the speed is very low (near a complete stop) the swash angle will automatically be set to maximum.

C. While the speed is low (traveling at a slow speed) the operator is allowed to change the swash angle to maximum, but not to minimum.

D. While the speed is high (traveling at a high speed) the operator is allowed to change the swash angle to minimum, but not to maximum.

The ranges defined as slow speed and high speed may simply end and begin at the same point, or may overlap, or there may be a range in-between where no change is allowed. The output is configurable to activate (closed switch) or deactivate (open switch) for maximum angle. The input is configurable to initiate a change when pulled high (to +battery voltage) or pulled low (to ground). These parameters are easily modified without having to remove or disassemble the device.

A second specific function this device is intended to address is a speed control loop. The device 10 again monitors the speed of the hydrostatic motor it is mounted to. This hydrostatic motor is driven by a hydrostatic pump with an Electrical Displacement Control (EDC) on it. The device drives the EDC to maintain a particular speed set point on the motor. A switch input is provided to indicate to the device when control should be enabled. Parameters such as set point, gain, etc. are easily modified without having to remove or disassemble the device.

FIGS. 5A–5H show several examples of applications intended for the present invention. Another application of the speed sensing device 10 is that of a smart speed switch. Two speed motors are used in many applications where there is a need to move rapidly between jobs and when at the job be able to apply significantly more force than while in transit. Often times the two speed motor is not placed in the correct speed for the task at hand and the drive system may be over stressed. The device 10 is intended to manage the two speed motor to minimize stress on the drive by placing the two speed motor in low (max swash angle) whenever the motor is stopped and by not allowing the user to switch to high (min angle) until the motor reaches a certain speed. The operator has a momentary switch which can be used to change the state of the two speed motor. The two speed motor can also be placed in low whenever the machine is traveling in reverse.

The following is a description of examples of parameters stored in the serial EE for this embodiment.

Serial EE parameters:

uiLowSwitchPoint: 200–65500

This value defines the slow speed range, any measured period above this value is defined as slow speed.

uiHighSwitchPoint: 200–65500

This value defines the fast speed range, any measured period below this value is defined as fast speed.

Together these 16 bit values define the hysteresis band (or lack of).

ucOutputAtLowSpeed: 0 or 1

This value defines the device polarity (NO or NC). Normal is low speed.

ucoutputInReverse: 0 or 1, set to 2 to ignore direction

This value defines what the output should be in the reverse direction. When traveling in reverse, the output will always go to this state as long as it is either 0 or 1.

ucSwitchActivateState: 0–7, 0 to ignore the switch

This value defines the state of the general purpose input which initiates or allows an output change.

In the following descriptions, input refers to the general purpose analog input. A low input is any voltage below 5/3 V on the input, a mid is any voltage between 5/3 and 10/3 volts, and a high is any voltage above 10/3 volts.

If set to 0 then the output will be allowed to change at anytime independent of the input.

If set to 1 then the output will be allowed to change anytime the input is low.

If set to 2 then the output will be allowed to change any time the input is mid.

If set to 3 then the output will be allowed to change anytime the input is high.

If set to 4 then the output will never change from its low speed state.

If set to 5 then the output will be allowed to change whenever the input changes to low.

If set to 6 then the output will be allowed to change whenever the input changes to mid.

If set to 7 then the output will be allowed to change whenever the input changes to high.

When a change is allowed, the micro will set the output state to ucOutputAtLowSpeed if the motor is spinning at a low speed or to the opposite of that if the motor is spinning at a high speed. The speed ranges are defined by the values uiLowSwitchPoint and uiHighSwitchPoint. Note, these speed ranges may overlap, or there may be a gap where the speed is not defined depending on the values stored in uiLowSwitchPoint and uiHighSwitchPoint.

ucNumSamplesToAverage: 1, 2, 4, or 8.

This value indicates the number of period measurements to average (a filter).

ucPeriodDivider: 1, 2, 4, 16, 32, or 64

This is a pre-divider on period measurements, if you are dealing with slow speeds where the period exceeds 0x FFFFh (65536)µs, you can use this pre-divider to bring the value back into range. As an example, if you want the low switch point to be 10 Hz, you could set the period divider to 4 and uiLowSwitchPoint to 25000 to achieve 100000 µs period.

ucPeriodMultiplier: 1, 4, or 16

This is a pre-multiplier on period measurements, if you are dealing with high speeds where the period is less than 200 µs, it is recommended that you use a period multiplier of 4 or 16 to reduce the number of interrupts to the microprocessor. For example if you wanted the high switch point to be 10 kHz, you could set the period multiplier to 4 and uiHighSwitchPoint to 400 to achieve 100 µs period.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A speed sensing device adapted to attach to a hydrostatic motor, said hydrostatic motor being a hydraulic motor connectable to a hydraulic pump in a high-pressure circuit and having a motor housing, comprising:

a sensor housing attachable to the motor housing of the hydrostatic motor;

a sensor coupled to the sensor housing for sensing the rotational speed, including angular velocity and direction, of the hydrostatic motor;

a microprocessor disposed within said sensor housing and connected to the sensor for receiving and processing the sensed rotational speed of the hydrostatic motor; and a connector coupled to the sensor housing for connecting the microprocessor to an external device to send and receive signals from the external device.

2. A switching device adapted to attach to a hydrostatic motor having a swashplate for controlling the operation of the hydrostatic motor depending on the angle of the swashplate, said hydrostatic motor being a hydraulic motor connectable to a hydraulic pump in a high-pressure circuit, the switching device comprising:

a sensor housing coupled to the hydrostatic motor;

a sensor coupled to the sensor housing for sensing the rotational speed, including angular velocity and direction, of the hydrostatic motor; a microprocessor disposed within said sensor housing and connected to the sensor for receiving and processing the sensed rotational speed and direction of the hydrostatic device and for generating a control signal based on the sensed rotational speed and direction of the hydrostatic motor;

a connector coupled to the sensor housing for connecting the microprocessor to the hydrostatic motor to send the control signal to the hydrostatic motor; and wherein said control signal controls the angle of the hydrostatic motor swashplate.

3. The speed sensing device of claim 1 wherein the sensor housing is threadedly mounted directly to the motor housing of the hydrostatic motor.

4. The speed sensing device of claim 1 wherein the microprocessor generates a high power output signal to drive a solenoid on the external device.

5. The speed sensing device of claim 1 wherein the microprocessor generates a high power output signal to drive an electrical displacement control on the external device.

6. The speed sensing device of claim 1 further comprising a temperature sensor coupled to the sensor housing.

7. A speed sensing device adapted to attach to a hydrostatic pump, said hydrostatic pump being a hydraulic pump connectable to a hydraulic motor in a high-pressure circuit, comprising:

a housing attachable to the hydrostatic pump;

a sensor coupled to the housing for sensing the rotational speed, including angular velocity and direction, of the hydrostatic pump a microprocessor disposed within said housing and connected to the sensor for receiving and processing the sensed rotational speed of the hydrostatic pump; and a connector coupled to the housing for connecting the microprocessor to an external device to send and receive signals from the external device.

8. The speed sensing device of claim 7 wherein the sensor housing is threadedly mounted directly to the pump housing of the hydrostatic pump.

9. The speed sensing device of claim 7 wherein the microprocessor generates a high power output signal to drive a solenoid on the external device.

10. The speed sensing device of claim 7 wherein the microprocessor generates a high power output signal to drive an electrical displacement control on the external device.

11. The speed sensing device of claim 7 further comprising a temperature sensor coupled to the sensor housing.

12. The speed sensing device of claim 1 wherein said sensor senses a magnetic field generated by a speed ring disposed inside said motor housing of said hydrostatic motor.

13. The speed sensing device of claim 1 wherein the microprocessor comprises a circuit board electrically connected to the connector and the sensor, the circuit board being attached to an end cap for rotation therewith, the end cap being rotatably mountable with respect to the sensor housing and retainable by at least one set screw in a given rotary position with respect to the sensor housing.

14. The speed sensing device of claim 1 wherein the sensor operatively extends into the motor housing to sense the rotational speed of the hydrostatic motor.

15. The speed sensing device of claim 9 wherein said sensor senses a magnetic field generated by a speed ring disposed inside said pump housing of said hydrostatic pump.

16. The speed sensing device of claim 9 wherein the microprocessor comprises a circuit board electrically connected to the connector and the sensor, the circuit board being attached to an end cap for rotation therewith, the end cap being rotatably mountable with respect to the sensor housing and retainable by at least one set screw in a given rotary position with respect to the sensor housing.

17. The speed sensing device of claim 9 wherein the sensor operatively extends into the pump housing to sense the rotational speed of the hydrostatic pump.

* * * * *

UNITED STATES PATENT AND TRADEMARK OFFICE
CERTIFICATE OF CORRECTION

PATENT NO.   : 5,933,795
DATED        : August 3, 1999
INVENTOR(S)  : Joseph Julius Schottler and C. Kells Hall It is certified that error appears in the above-identified patent and that said Letters Patent is hereby corrected as shown below:

Column 6, line 54, delete the numeral "9" and insert the numeral - 7 -.

Column 6, line 57, delete the numeral "9" and insert the numeral - 7 -.

Column 6, line 64, delete the numeral "9" and insert the numeral - 7 -.

Signed and Sealed this

Twenty-first Day of December, 1999

Attest:

Q. TODD DICKINSON

*Attesting Officer*   *Acting Commissioner of Patents and Trademarks*